(12) United States Patent
Mule' et al.

(10) Patent No.: US 6,947,651 B2
(45) Date of Patent: Sep. 20, 2005

(54) OPTICAL WAVEGUIDES FORMED FROM NANO AIR-GAP INTER-LAYER DIELECTRIC MATERIALS AND METHODS OF FABRICATION THEREOF

(75) Inventors: Tony Mule', Atlanta, GA (US); Paul Kohl, Atlanta, GA (US); James D. Meindl, Marietta, GA (US); Agnes Padovani, Phoenix, AZ (US); Thomas K. Gaylord, Atlanta, GA (US); Elias N. Glytsis, Dunwoody, GA (US); Sue Ann B. Allen, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 341 days.

(21) Appl. No.: 10/142,601

(22) Filed: May 10, 2002

(65) Prior Publication Data

US 2002/0186950 A1 Dec. 12, 2002

Related U.S. Application Data

(60) Provisional application No. 60/363,057, filed on Mar. 11, 2002, and provisional application No. 60/290,118, filed on May 10, 2001.

(51) Int. Cl.⁷ .............................. G02B 6/02; G02B 6/20
(52) U.S. Cl. ...................................................... 385/125
(58) Field of Search ................................ 385/124–129

(56) References Cited

U.S. PATENT DOCUMENTS

| | | | |
|---|---|---|---|
| 3,873,339 A | 3/1975 | Hudson | 117/17 |
| 3,880,630 A | 4/1975 | Izawa | 65/30 |
| 3,934,061 A | 1/1976 | Keck et al. | 427/165 |
| 3,952,407 A | 4/1976 | Aupoix et al. | 29/600 |
| 3,969,814 A | 7/1976 | Toy et al. | 29/600 |
| 4,022,602 A | 5/1977 | Pavlopoulos | 65/102 |
| 4,123,483 A | 10/1978 | Nakahara et al. | 264/1 |
| 4,181,515 A | 1/1980 | Dyott et al. | 65/3 |
| 4,263,030 A | 4/1981 | Kobayashi et al. | 65/2 |
| 4,284,663 A | 8/1981 | Carruthers et al. | 427/164 |
| 4,411,678 A | 10/1983 | Arai | 65/3.12 |
| 4,676,820 A | 6/1987 | Le Sergent et al. | 65/3.12 |
| 4,712,854 A | 12/1987 | Mikami et al. | 350/96.12 |
| 4,712,855 A | 12/1987 | Tolksdorf et al. | 350/96.12 |
| 4,764,246 A | 8/1988 | Bridges et al. | 156/643 |
| 4,783,136 A | 11/1988 | Elman et al. | 350/96.12 |
| 4,818,722 A | 4/1989 | Heinen | 437/129 |
| 4,818,962 A | 4/1989 | Molaine et al. | 333/239 |
| 4,840,816 A | 6/1989 | Appleton et al. | 427/38 |
| 4,849,080 A | 7/1989 | Doorman et al. | 204/192.15 |
| 4,856,856 A | 8/1989 | Winstone | 312/231 |
| 4,856,859 A | 8/1989 | Imoto | 350/96.12 |
| 4,913,717 A | 4/1990 | Cooper | 65/30.13 |
| 4,934,774 A | 6/1990 | Kalnitsky et al. | 350/96.12 |
| 4,947,540 A | 8/1990 | Komachi | 29/600 |
| 4,949,352 A | 8/1990 | Plumb | 372/46 |
| 5,018,809 A | 5/1991 | Shin et al. | 350/96.12 |
| 5,028,246 A | 7/1991 | Sarkar | 65/3.12 |

(Continued)

OTHER PUBLICATIONS

Article entitled "High–performance polymeric materials for waveguide applications", dated Aug. 1–3, 2000, vol. 4106, SPIE—The International Society for Optical Engineer, by Glukh, et al., pp. 1–11.

*Primary Examiner*—Joseph Williams
*Assistant Examiner*—Peter Macchiarolo
(74) *Attorney, Agent, or Firm*—Thomas, Kayden, Horstemeyer & Risley, LLP

(57) ABSTRACT

Waveguides and methods of fabrication thereof are presented. A representative waveguide includes a waveguide core and a cladding layer, where the cladding layer surrounds the waveguide core. The waveguide core and cladding can be made of a host material having a plurality of nano-pores, wherein the nano-pores include a sacrificial material, and the sacrificial material can be selectively decomposed in both the core and cladding layers to form a plurality of nano air-gaps.

13 Claims, 6 Drawing Sheets

U.S. PATENT DOCUMENTS

| | | |
|---|---|---|
| 5,035,734 A | 7/1991 | Honkanen et al. .......... 65/30.13 |
| 5,035,916 A | 7/1991 | Kalnitsky et al. .............. 427/38 |
| 5,052,769 A | 10/1991 | Aoki et al. ................... 385/130 |
| 5,054,872 A | 10/1991 | Fan et al. .................... 385/130 |
| 5,057,135 A | 10/1991 | Maruyama et al. ......... 65/30.13 |
| 5,066,514 A | 11/1991 | Oyoshi ........................ 427/38 |
| 5,080,503 A | 1/1992 | Najafi et al. ..................... 385/1 |
| 5,080,931 A | 1/1992 | Trundle et al. .............. 427/164 |
| 5,094,553 A | 3/1992 | Yakmymyshyn et al. ... 385/122 |
| 5,106,211 A | 4/1992 | Chiang et al. ............... 385/132 |
| 5,113,471 A | 5/1992 | Inaishi et al. ................ 385/126 |
| 5,114,453 A | 5/1992 | Ross et al. .................. 65/30.13 |
| 5,115,512 A | 5/1992 | Fujiwara et al. .............. 385/14 |
| 5,134,681 A | 7/1992 | Ratovelomanana et al. . 385/130 |
| 5,138,687 A | 8/1992 | Horie et al. ................. 385/129 |
| 5,160,523 A | 11/1992 | Honkanen et al. .......... 65/30.13 |
| 5,166,515 A | 11/1992 | Attridge ................. 250/227.25 |
| 5,168,542 A | 12/1992 | Chakravorty et al. ....... 385/132 |
| 5,194,079 A | 3/1993 | Tumminelli et al. ......... 65/3.11 |
| 5,196,041 A | 3/1993 | Tumminelli et al. ......... 65/30.1 |
| 5,265,184 A | 11/1993 | Lebby et al. ................ 385/132 |
| 5,305,403 A | 4/1994 | Kashyap ....................... 385/37 |
| 5,325,458 A | 6/1994 | Morrow et al. .............. 385/125 |
| 5,345,530 A | 9/1994 | Lebby et al. .................. 385/88 |
| 5,390,275 A | 2/1995 | Lebby et al. ................ 385/132 |
| 5,407,990 A | 4/1995 | Maeda et al. ............... 524/407 |
| 5,480,050 A | 1/1996 | Morrow et al. ................ 216/24 |
| 5,511,142 A | 4/1996 | Horie et al. ................. 385/129 |
| 5,551,966 A | 9/1996 | Hirose et al. ................. 65/377 |
| 5,622,750 A | 4/1997 | Kilian et al. .............. 427/163.2 |
| 5,708,739 A | 1/1998 | Patton .......................... 385/37 |
| 5,729,646 A | 3/1998 | Miyagi et al. ............... 385/125 |
| 5,733,481 A | 3/1998 | Hayashida et al. .......... 252/582 |
| 5,861,782 A | 1/1999 | Saitoh ......................... 333/239 |
| 5,872,883 A | 2/1999 | Ohba et al. .................. 385/129 |
| 5,903,697 A | 5/1999 | Yamada et al. ............. 385/129 |
| 5,949,942 A | 9/1999 | O'Connor .................... 385/129 |
| 5,979,188 A | 11/1999 | Ojha ............................ 65/386 |
| 5,995,696 A | 11/1999 | Miyagi et al. ............... 385/125 |
| 6,085,012 A | 7/2000 | O'Connor .................... 385/129 |
| 6,226,433 B1 | 5/2001 | Weber ......................... 385/129 |
| 6,233,388 B1 | 5/2001 | Kim et al. .................... 385/143 |
| 6,272,275 B1 | 8/2001 | Cortright et al. ............ 385/129 |
| 6,324,313 B1 | 11/2001 | Allman et al. ................. 385/14 |
| 6,376,078 B1 * | 4/2002 | Inokuchi ...................... 428/403 |
| 6,466,708 B2 * | 10/2002 | Yokoyama et al. ........... 385/14 |
| 6,493,496 B2 * | 12/2002 | Nagata ....................... 385/129 |
| 6,710,366 B1 * | 3/2004 | Lee et al. ...................... 257/14 |

\* cited by examiner

SECTION A-A

OPTICAL WAVEGUIDES FORMED FROM NANO AIR-GAP INTER-LAYER DIELECTRIC MATERIALS AND METHODS OF FABRICATION THEREOF

CROSS-REFERENCE TO RELATED APPLICATION

This application claims priority to U.S. provisional applications entitled, "Monolithic Chip-level Optical Waveguides Formed From Low-k Nano Air-gap Inter-layer Dielectric (ILD) Materials and Methods," having Ser. No. 60/290,118, filed May 10, 2001, and "Monolithic Chip-level Optical Waveguides Formed From Low-k Nano Air-gap Inter-layer Dielectric (ILD) Materials and Methods," having Ser. No. 60/363,057, filed Mar. 11, 2002, both of which are entirely incorporated herein by reference.

STATEMENT REGARDING FEDERALLY SPONSORED RESEARCH OR DEVELOPMENT

The U.S. government may have a paid-up license in this invention and the right in limited circumstances to require the patent owner to license others on reasonable terms as provided for by the terms of MDA 972-99-1-0002 awarded by the DARPA of the U.S. Government.

TECHNICAL FIELD

The present invention is generally related to optical waveguides and, more particularly, embodiments of the present invention are related to waveguides constructed from nano air-gap materials and methods of fabrication thereof.

BACKGROUND OF THE INVENTION

In its simplest form, an optical waveguide is an interconnect medium represented by two regions of different refractive index. The core region of a waveguide is represented by the region of higher refractive index, while the cladding region is represented by the region of lower refractive index. For confinement and guiding of optical energy to occur, the region of high refractive index must be surrounded by the region of lower refractive index.

To create this contrast in refractive index, $\Delta n$, between core and cladding regions, optical waveguides are made using a variety of methods and materials. Previous fabrication techniques include molding, embossing or casting (U.S. Pat. Nos. 6,272,275 and 6,233,388), photo-bleaching (U.S. Pat. No. 5,708,739), aerosol deposition (U.S. Pat. No. 5,622,750), lamination (U.S. Pat. No. 5,5407,990), guttering (U.S. Pat. No. 5,196,041), laser-writing (U.S. Pat. No. 4,949,352), metal (U.S. Pat. No. 4,284,663) and ion (U.S. Pat. Nos. 5,160,523, 5,114,453, 6,226,433, 5,979,188) diffusion and doping (U.S. Pat. No. 5,080,931), and thermal diffusion (U.S. Pat. Nos. 5,194,079 and 5,551,966), for example.

Waveguides made from optical polymer materials are of particular interest due to their low cost and ease of manufacture (K. Glukh, et al, *Proc. SPIE Linear, Nonlinear, and Power-limiting Organics*, 43–53, August 2000) with respect to integration within gigascale (GSI) microelectronics (International Technology Roadmap for Semiconductors, 2001 update). One limitation of polymer materials, however, which restricts the maximum waveguide density and minimum bending radius of an optical waveguide pathway is the low refractive index contrast between process-compatible core and cladding materials. Typical values for $\Delta n$ are low within polymer technologies (e.g., $\Delta n=0.03$) (K. Glukh, et al., *Proc. SPIE Linear, Nonlinear, and Power-limiting Organics*, 43–53, August 2000). A high $\Delta n$ increases confinement of optical energy within the core region, which in turn allows for higher waveguide densities due to the reduction in optical crosstalk and smaller radii bent waveguide paths.

Interconnect density constraints imposed by GSI microelectronics are such that high $\Delta n$ waveguide technologies ($\Delta n>0.1$) are required for chip-level integration (U.S. Pat. No. 6,324,313) of optical waveguides. For the purposes of intra-chip optical data interconnection, for example, a waveguide technology that simultaneously allows for high $\Delta n$ and low-$n_{\mathit{eff}}$ is required to exceed the performance of alternate electrical-interconnect technologies.

Thus, a heretofore unaddressed need exists in industries employing optical waveguide technology to address the aforementioned deficiencies and/or inadequacies.

SUMMARY OF THE INVENTION

Briefly described, the present invention provides for waveguides and methods of fabrication thereof A representative waveguide includes a waveguide core and a cladding layer, where the cladding layer surrounds the waveguide core. The waveguide core can be made of a host material having a plurality of nano-pores, wherein the nano-pores include a sacrificial material. The cladding layer can be made of the host material having a plurality of nano air-gaps.

The present invention also involves methods of fabricating waveguides. A representative method for fabricating a waveguide includes: disposing a first host material layer onto a substrate, wherein the first host material layer includes a plurality of nano-pores, wherein the nano-pores include a sacrificial material; removing a portion of the sacrificial material from the nano-pores in a first region of the first host material layer, wherein the first region defines a first cladding layer; disposing a second host material layer onto the first cladding layer, wherein the first host material layer and the second host material layer are the same; removing a portion of the sacrificial material from the nano-pores in a second region of the second host material layer that defines the waveguide core; disposing a third host material layer onto the first cladding layer and the waveguide core, wherein the first host material layer, the second host material layer, and the third host material layer are the same; and removing a portion of the sacrificial material from the nano-pores in a third region of the third host material layer, wherein the first region defines a second cladding layer, and wherein the first and second cladding layers surround the waveguide core forming a cladding layer.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6B is a cross-sectional view of FIG. 6A in the A—A direction, as shown by the arrows in FIG. 6A.

DETAILED DESCRIPTION

Figure 1:
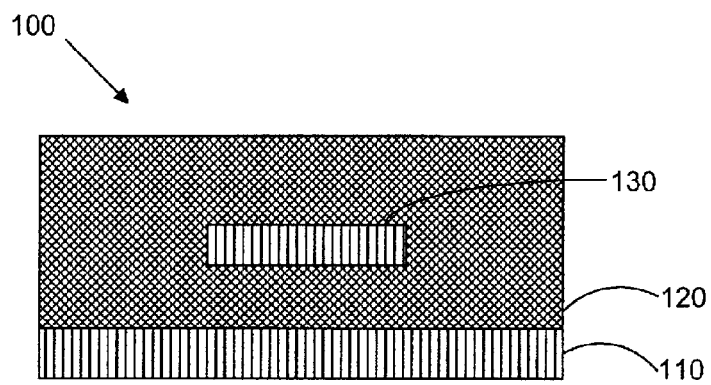
FIG. 1 is a schematic that illustrates a cross-sectional view of an optical waveguide.

In general, embodiments of the present invention provide for optical waveguides having a waveguide core and a cladding layer. The waveguide core and cladding layers are made of a low dielectric constant material (e.g., methylsilsesquioxane) that provides for both enhanced electrical interconnect performance and a functional optical interconnect pathway. In this regard, the waveguide can be embedded within a layer of inter-layer dielectric as part of an on-chip metal stack within gigascale (GSI) microelectronic devices, micromechanical devices, compound semiconductor microelectronics, and complementary metal oxide semiconductor wafers, for example.

Embodiments of the waveguide can include waveguide core and cladding layers made of a low dielectric constant material (hereinafter "host material") having nano-pores. The nano-pores, made possible through the integration of a sacrificial material into the host material, permit transparent (i.e., low-loss) optical pathways due to the extremely small (1–15 nm) dimensions of the nano-pores. Nano air-gaps (i.e., nano-pores where the sacrificial material has been removed) can be made in the host material by removing a portion of the sacrificial material, within select regions of the host material, through decomposition or other methods. Areas where nano air-gaps are formed have a lower refractive index than the remaining portion of the host material. Therefore, using a single solution of a host material composed of a given percent weight of sacrificial material, a cladding region can be defined through controlled formation of nano air-gaps in that region, leaving the remaining areas of the host material to define the waveguide core. In this manner, a high difference in refractive index between the waveguide core and the cladding layer can be realized.

The weight percent (i.e., between 0% and 99%) of the sacrificial material integrated within the host material determines the range of refractive indices available for the cladding and waveguide core regions. Consequently, the refractive index of the core and cladding regions can be tailored through both controlled removal of the sacrificial material through decomposition or other methods and by the amount of sacrificial material incorporated into the host material (e.g., indices of refraction about 1.0 to about 1.5 and contrast in refractive index of about 0.3).

Embodiments of the present invention are based upon materials with a low dielectric constant such that incorporation of nano air-gap waveguides within a chip-level inter-layer dielectric layer is possible. Low dielectric constant materials incorporated into chip-level metallic interconnection stacks reduce capacitive cross-talk between adjacent metal layers and allow for higher integration densities of electrical interconnections.

Now having described waveguides in general, potential embodiments of the present invention will be described in Examples 1–3. While embodiments of the waveguides are described in connection with Examples 1–3 and the corresponding text and figures, there is no intent to limit embodiments of the waveguides to these descriptions. On the contrary, the intent is to cover all alternatives, modifications, and equivalents included within the spirit and scope of embodiments of the present invention. Embodiments of the present invention are defined by claims, and examples are merely illustrative and are not intended to limit the scope of the claims.

Example 1

FIG. 1 is a schematic that illustrates waveguide 100. Waveguide 100 includes a substrate 110, a cladding layer 120, and a waveguide core 130. The waveguide core 130 is disposed within the cladding layer 120, which is disposed on the substrate 110. Additional details regarding the spatial relationship of the components of waveguide 100, depicted in FIG. 1, are discussed in FIGS. 2A–2M and FIGS. 3A–3K, which illustrate exemplary fabrication processes of waveguide 100. It should be noted that other fabrication processes (i.e., a fabrication process similar to the process shown in FIG. 5A–5G) could be used to fabricate waveguide 100, for example.

In general, waveguide 100 can be defined through multiple fabrication processes such as, but not limited to, photo-definition, wet chemical etching, and thermally-induced refractive index gradients. In addition, waveguide 100 can have geometries such as, for example, raised strip geometry, buried geometry, or rib geometry. Raised-Strip waveguides are characterized by a "raised strip" of core material which resides atop a substrate characterized by a lower index of refraction than the core. The upper cladding layer is characterized by a lower refractive index than the substrate. Buried channel waveguides are characterized by a core region, which is "buried" or surrounded by a lower-index cladding material. Rib waveguides are characterized by a conventional rectangular core geometry that resides atop a thin layer, where both of the regions are composed of the same material. As above, the core refractive index is higher than the substrate index and upper cladding index.

As indicated above, waveguide 100 includes a substrate 110. The substrate 110 can be any of a variety of substrates found in microelectronic or telecommunications devices. The substrate 110 can include, for example, a complementary metal oxide semiconductor wafer, compound semiconductor wafer, a fully processed semiconductor substrate, a partially processed semiconductor substrate, a dielectric substrate, a printed wiring board, a multi-chip module, fused silica, or a backplane substrate.

The cladding layer 120 and the waveguide core 130 can be formed from the same material solution composed of a host material and a sacrificial material. The host material can be a low dielectric constant polymer or a low dielectric constant glass. In particular, the host material can include, but is not limited to, methylsilsesquioxane (MSQ), or organic waveguide materials such as polyimides, for example.

The sacrificial material can include, but is not limited to, trimethoxysilyl norbornene (TMSNB), polynorbornenes, polyoxymethylene, polycarbonates, polyethers, and polyesters. More specifically the sacrificial material includes compounds such as BF Goodrich Unity™ 400, polypropylene carbonate, polyethylene carbonate, polyhexene carbonate, and polynorborene carbonate. In addition, volatile components such as mesitylene or other solvents, for example, that could be volatilized at higher temperatures or longer cure times could serve as the sacrificial component. In some embodiments the sacrificial material includes an ultra violet catalyst that can be activated to decompose the sacrificial material. The sacrificial material may also contain photosensitive compounds, which are additives for patterning or decomposition. The addition of a second component to the sacrificial material can deter its decomposition temperature. An acid will lower the decomposition temperature. Acids can be generated by acidation of a photoacid generator, thus making the sacrificial polymer photosensitive.

The nano-pores, represented by the sacrificial material, can be converted into nano air-gaps through removal of the sacrificial material. In particular, specific regions of the host material can be treated (e.g., heated) to remove sacrificial material from only nano-pores in that region. The removal of sacrificial material from the nano-pores can be performed through a variety of techniques, including, but not limited to, thermal decomposition, photo-induced decomposition, or volatilization of the sacrificial material. The concentration of the sacrificial material within the nano air-gap can range from 0% to about 99% by weight sacrificial material and preferably from 0% to about 40% by weight sacrificial material. The amount of sacrificial material removed depends, in part, upon the desired refractive index contrast between the cladding layer 120 and the waveguide core 130. In one embodiment, the refractive index contrast is greatest when the concentration of the sacrificial material is maximum in the cladding layer 120 and the concentration of sacrificial material is minimum in the waveguide core 130.

The sacrificial material can also be a volatile component, which does not decompose, such as a solvent trapped in the host matrix, which can be volatilized at a higher temperature or a longer cure time of the host material. For example, if a solvent such as mesitylene were trapped inside a host matrix such as polyimide or epoxy, the solvent could be removed after the host matrix is cured, leaving nano air-gap regions and thereby creating regions of lower refractive index.

Alternatively, the concentration of sacrificial material in both the cladding layer 120 and the waveguide core 130 can be varied to achieve a range of relative index differences. In this regard, the concentration of the sacrificial material in the waveguide core 130 is less than that in the waveguide cladding region.

The sacrificial material can be, but is not limited to, polymers that slowly decompose in a manner to not create excessive pressure while forming the nano air-gap. In addition, in the case of decomposition of the sacrificial material to produce nano air-gaps, the decomposition process should produce gas molecules small enough to permeate the host material in the cladding layer 120 and/or the core layer 130, depending upon the location of the sacrificial material. Further, in the case of decomposition of the sacrificial material to produce nano air-gaps, the sacrificial material has a decomposition temperature less than the decomposition or degradation temperature of the host material, but greater than the cure temperature of the host material.

More specifically, Table 1 illustrates the refractive index of a material as a function of sacrificial material concentration within the cladding layer. In Table 1, the host material is MSQ having TMSNB as the sacrificial material in the nano-pores. As shown in Table 1, the refractive index of the MSQ is measured as a function of the concentration of TMSNB within the host material. For example, the refractive index is 1.420 when the concentration of TMSNB is 0% and 1.287 for a concentration of TMSNB=30%. Therefore, in the case where a single solution of 30% weight TMSNB is applied to an appropriate substrate and selective decomposition of the nano-pores is performed, a refractive index contrast $\Delta n=0.133$ can be achieved between the core and cladding regions of an optical waveguide formed within the material (FIGS. 2A–2M, for example). Alternatively, in the case where two solutions of material are used (FIGS. 5A–5G, for example), the first solution of 0% weight TMSNB and the second solution of 30% weight, an optical waveguide can be formed with the same $\Delta n$ by enclosing a patterned region of the 0% solution within the 30% solution and fully decomposing the entire 30% solution to form the cladding region.

TABLE 1

| POLYNORBORENE CONCENTRATION | INDEX OF REFRACTION (@ 632.8 nm) |
|---|---|
| 0 | 1.420 |
| 10 | 1.352 (1.37)* |
| 20 | 1.321 (1.33)* |
| 30 | 1.287 (1.30*) |

The diameter of the nano-pores/nano air-gaps can range from about 1 to about 15 nanometers, with the preferred diameter being about 5 to about 10 nanometers.

The composite material can be deposited using techniques such as, for example, spin coating, doctor-blading, sputtering, chemical vapor deposition (CVD), and plasma based deposition systems.

The sacrificial material can be removed, for example, by thermal decomposition, ultraviolet irradiation, or volatilization, for example. The thermal decomposition of the sacrificial material can be performed by heating one of the deposited layers or waveguide 100 to the decomposition temperature of the sacrificial material and holding at that temperature for a certain time period (e.g., 1–4 hours). Thereafter, the decomposition products diffuse through the appropriate regions.

As depicted in FIG. 1, the waveguide 100 includes a cladding layer 120 surrounding a portion of the waveguide core 130. The cladding layer 120 has a lower index of refraction than the waveguide core 130.

Although not depicted in FIG. 1, the waveguide 100 can include coupler elements disposed at each end of the waveguide core 130. In this manner, energy (e.g., light) can enter one coupling element, travel down the waveguide core 130, and exit another coupling element.

Although only one waveguide core 130 is depicted in FIG. 1, one or more waveguide cores can be included in waveguide 100. In addition, multiple levels of waveguides and/or waveguide cores can be built atop one another.

Generally, during the fabrication process of waveguide 100, a first layer of the material having nano-pores is deposited onto the substrate 110 and patterned. Thereafter, the first layer is thermally cured, and the decomposition of the nano-pores is enabled by oven cure at a higher temperature or by depositing a metal or other heat-carrying material atop select regions of the layer to thermally decompose the sacrificial material in select areas, hence, forming a first layer of the cladding layer 120. Subsequently, a second layer of the same material is deposited onto the first layer. A portion of the nano-pores included within the second layer of the material is selectively removed through the same process as the lower cladding layer, thus forming a second layer of the cladding layer 120. In addition, the portion of the nano-pores within the second layer where the sacrificial material is not removed forms the waveguide core 130. Subsequently, a third layer of the material is deposited onto all portions of the second layer and is then thermally cured in the same manner as the first and second layers of the cladding layer, after which the selective removal of nano-pores from the third layer to form a cladding layer 120 is performed. The processes forming the cladding layer 120 and the waveguide layer 130 are discussed in more detail hereinafter.

For the purposes of illustration only, and without limitation, waveguide 100 can be described with particular reference to the below-described fabrication method. For clarity, some portions of the fabrication process are not included in FIGS. 2A–2M. For example, photolithography or similar techniques can be used to define the first and second cladding layers and/or the waveguide core 130 pattern.

The following fabrication process is not intended to be an exhaustive list that includes all steps required for fabricating waveguide 100. In addition, the fabrication process is flexible because the process steps may be performed in a different order than the order illustrated in FIGS. 2A–2M. In addition, other waveguides (e.g., waveguides 140 and 200, FIGS. 4 and 6A–6B, respectively) can be fabricated from the following fabrication process or a similar fabrication process.

Figure 2A:
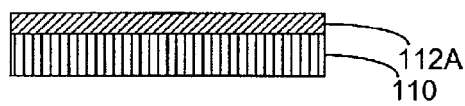
FIGS. 2A–2M are cross-section views of the fabrication process of the optical waveguide illustrated in FIG. 1.

FIG. 2A–2M are cross-sectional views of a fabrication process relative to the view illustrated in FIG. 1. In particular, the fabrication process shown in FIGS. 2A–2M describes a thermal fabrication process for forming waveguide 100. FIG. 2A illustrates the first layer 112A of the host material disposed on the substrate 110. As indicated above, the host material includes nano-pores having a sacrificial material disposed therein.

Figure 2D:
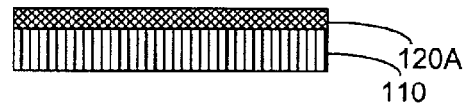
Figure 2B:
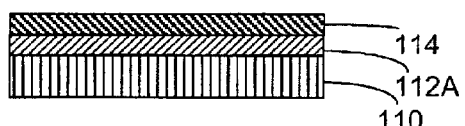

FIG. 2B illustrates a metal shield 114 disposed on first layer 112A of the host material. The metal shield 114 is disposed on the first layer 112A to thermally remove sacrificial material from nano-pores located within the first layer 112A and, hence, create nano air-gaps within the first layer 112A. The metal shield 114 includes metals such as, for example, gold (Au), titanium (Ti), chromium (Cr), or aluminum (Al), composites of these metals.

Figure 2E:
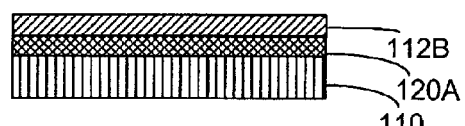
Figure 2C:
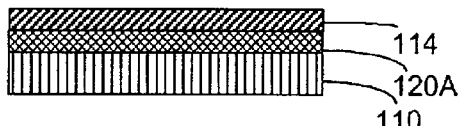

FIG. 2C illustrates the thermally-induced removal of sacrificial material from nano-pores within the first layer 112A to form the first cladding layer 120A. The thermally-induced removal is achieved by heating the metal shield 114 to the decomposition temperature or boiling point of the sacrificial material in the nano-pores. The type of sacrificial material and the concentration of the sacrificial material within the host material determine both the temperature and the time period governing the thermally-induced removal of material.

FIG. 2D illustrates the removal of the metal shield 114.

FIG. 2E illustrates the second layer 112B of the host material disposed on the first cladding layer 120A.

Figure 2F:
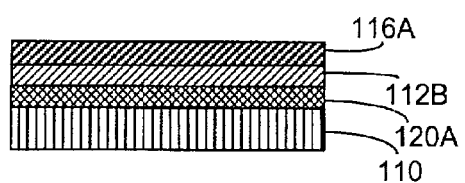

FIG. 2F illustrates a metal shield 116A (i.e., for thermally-induced removal of material) disposed on the second layer 112B of the material.

Figure 2G:
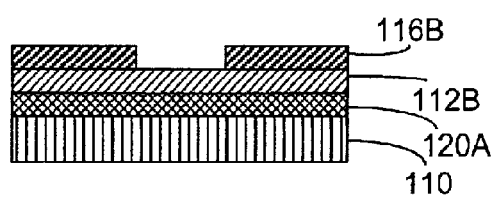

FIG. 2G illustrates the patterning of the metal shield 116A into metal shield 116B. The metal shield 116A is patterned to define the region where the second cladding layer 120B and the waveguide core 130 are to be formed.

Figure 2K:
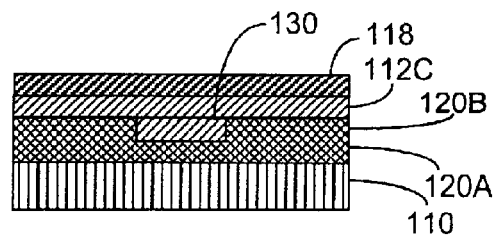
Figure 2H:
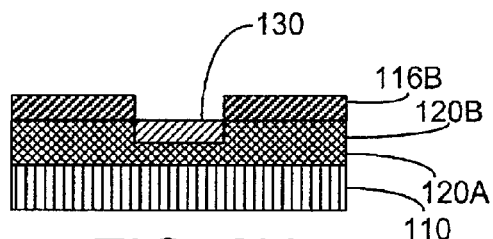

FIG. 2H illustrates the thermally-induced removal of nano-pores within the second layer 112B to form the second cladding layer 120B. As indicated above, the thermally-induced removal of sacrificial material is achieved by heating the metal shield 116B to the decomposition temperature or boiling point of the sacrificial material in the nano-pores. The region where the metal shield 116B has been etched away defines the waveguide core 130.

Figure 2L:
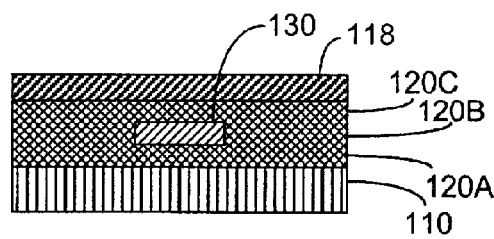
Figure 2I:
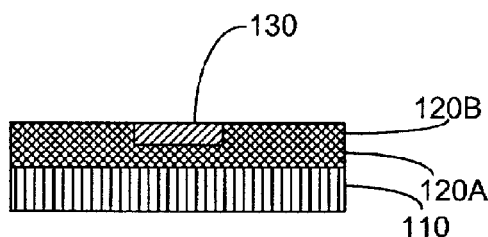

FIG. 2I illustrates the removal of the metal shield 116C from the second cladding layer 120B.

Figure 2M:
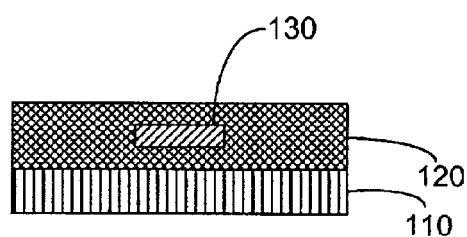
Figure 2J:
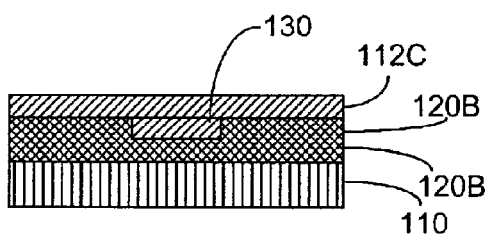

FIG. 2J illustrates the third layer 112C of the host material disposed on the second cladding layer 120B and the waveguide core 130.

FIG. 2K illustrates a metal shield 118 (i.e., for thermally-induced removal of sacrificial material) disposed on third layer 112C of the host material.

FIG. 2L illustrates the thermally-induced removal of sacrificial material from nano-pores within the third layer 112C to form the third cladding layer 120C. As indicated above, the thermally-induced removal of sacrificial material is achieved by heating the metal shield 118 to the decomposition temperature or boiling point of the sacrificial material in the nano-pores.

FIG. 2M illustrates the removal of the metal shield 114, thereby forming waveguide 100. The first, second, and third cladding layer 120A–120C form the cladding layer 120.

It should be noted that the foregoing method shown in FIGS. 2A–2M can be altered to incorporate adding coupler elements and other components.

FIGS. 3A–3K are cross-sectional views of a fabrication process relative to the view illustrated in FIG. 1. In particular, the fabrication process shown in FIGS. 3A–3K describes an ultra-violet (UV)-based fabrication process for forming waveguide 100.

Figure 3A:
FIGS. 3A–3K are cross-sectional views of another fabrication process of the optical waveguide illustrated in FIG. 1.

FIG. 3A illustrates the first layer 112A of the host material disposed on the substrate 110. As indicated above, the host material includes nano-pores having a sacrificial material disposed therein.

Figure 3B:
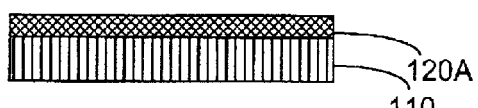

FIG. 3B illustrates the UV-induced decomposition or volatilization of the sacrificial material within the first layer 112A to form the first cladding layer 120A. The decomposition is achieved by UV irradiation of the first layer 112A. In the case of decomposition of the sacrificial material, decomposition is initiated with the activation of a UV-sensitive catalyst within the sacrificial material. The type and concentration of the sacrificial material and the type and concentration of the catalyst determine the appropriate dose of UV energy required to initiate decomposition.

Figure 3C:
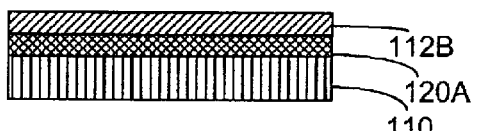

FIG. 3C illustrates the second layer 112B of the material disposed on the first cladding layer 120A.

Figure 3D:
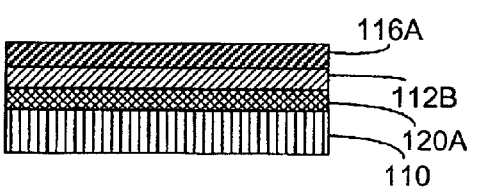

FIG. 3D illustrates a hard mask 116A disposed on the second layer 112B of the material, which is used to deter UV-induced decomposition or volatilization within the host material immediately below the hard mask 116A. The hard mask 116A can be constructed from material such as, for example, gold (Au), titanium (Ti), chromium (Cr), or aluminum (Al), composites of these metals, or any dielectric material that absorbs UV radiation.

Figure 3E:
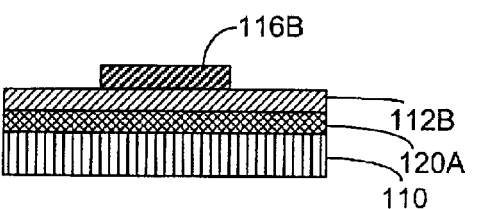

FIG. 3E illustrates patterning the hard mask 116A into hard mask 116B. The hard mask 116A is patterned to define the region where the second cladding layer 120B and the waveguide core 130 are to be formed.

Figure 3F:
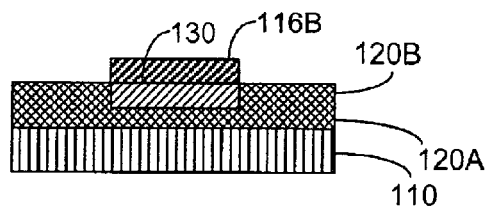

FIG. 3F illustrates the UV-induced decomposition or volatilization within the second layer 112B into the second cladding layer 120B. The region where the hard mask 116B is located defines the waveguide core 130.

Figure 3G:
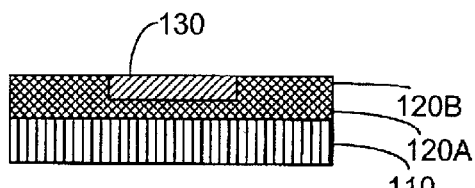

FIG. 3G illustrates the removal of the hard mask 116B from the waveguide core 130. It should be noted that in addition to depositing and defining a hard mask (FIG. 3D–3F), conventional photolithographic techniques incorporating a photomask to block exposure of select regions can also be employed to produce FIG. 3G.

Figure 3H:
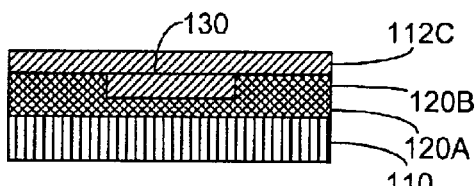

FIG. 3H illustrates the application of a third layer 112A of the material disposed on the second cladding layer 120B and the waveguide core 130.

Figure 3I:
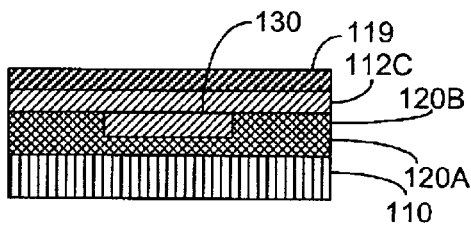

FIG. 3I illustrates a metal shield 119 for thermally-induced decomposition or volatilization of the sacrificial material within the nano-pores located within the third layer 112C of the material.

Figure 3J:
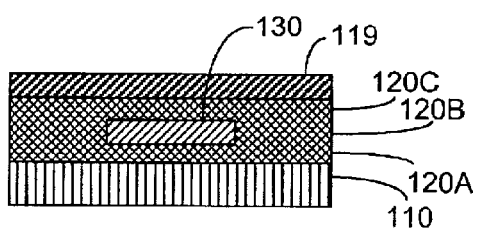

FIG. 3J illustrates the thermally-induced decomposition or volatilization of sacrificial material within nano-pores located within the third layer 112C to form the third cladding layer 120C. As indicated above, the thermally-induced decomposition or volatilization is achieved by heating the metal shield 119 to the decomposition temperature or boiling point of the sacrificial material in the nano-pores.

Figure 3K:
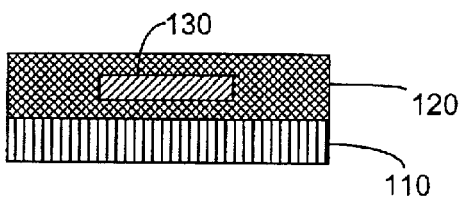

FIG. 3K illustrates the removal of metal shield 119, thereby forming the waveguide 100. The first, second, and third cladding layers 120A–120C form the cladding layer 120.

It should be noted that the foregoing method shown in FIGS. 3A–3K can be altered to incorporate coupler elements and other components.

Example 2

Figure 4:
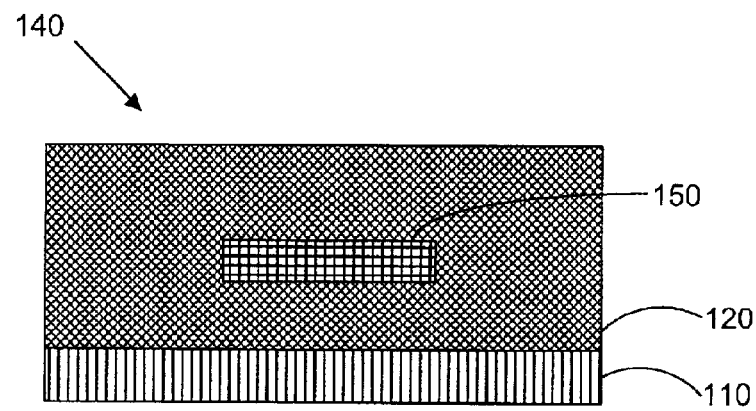
FIG. 4 is a schematic that illustrates a cross-sectional view of another optical waveguide.

FIG. 4 is a schematic that illustrates waveguide 140. Waveguide 140 includes a substrate 110, a cladding layer 120, and a waveguide core 150. The waveguide core 150 is disposed in the cladding layer 120, which is disposed on the substrate 110. Additional details regarding the spatial relationship of the components of waveguide 140, depicted in FIG. 4, are discussed in FIG. 5A–5G, which illustrate exemplary fabrication processes of waveguide 140. It should be noted that other fabrication processes (i.e., a fabrication process similar to the process shown in FIGS. 2A–2M and FIGS. 3A–3K) could be used to fabricate waveguide 140.

In general, the waveguide 150 can be defined through multiple fabrication processes as described herein in relation to waveguide 100. In addition, the waveguide 140 includes a substrate 110. The substrate 110 can be any of a variety of substrates found in semiconductor microelectronic or telecommunications devices as discussed herein in reference to waveguide 100.

The cladding layer 120 and the waveguide core 130 can be formed from material solutions composed of a first host material and a second host material each mixed with different percent weights of a sacrificial material. The first and second host materials can be low dielectric constant polymers or low dielectric constant glasses. The first and second host materials are analogous to the host material described herein in reference to waveguide 100.

The first and second host materials contain nano-pores, represented by the sacrificial material. The nano-pores can be converted into nano air-gaps through selective removal of the sacrificial material from the nano-pores located in the first and second host materials through decomposition or volatilization, for example.

In this embodiment, the waveguide is formed through the use of the first and second host materials each having a different percent weight of sacrificial material, as opposed to using a single solution of host material with a single percent weight of sacrificial material as in other embodiments. In other words, the waveguide core 140 is made from a first host/sacrificial material solution, while the cladding layer 120 is made from a second host/sacrificial material solution. The weight percent of sacrificial material within the core layer can vary from 0% to 99%, while the weight percent of sacrificial material within the cladding layer can vary from 1% to 99%. Since the first and second host materials have different percent weights of sacrificial material, the first and second host materials can have different refractive indices after removal of the sacrificial material.

Although not depicted in FIG. 4, the waveguide 140 can include coupler elements disposed at each end of the waveguide core 150. In this manner, energy (e.g., light) can enter one coupling element, travel down the waveguide core 130, and exit another coupling element.

Although only one waveguide core 130 is depicted in FIG. 4, one or more waveguide cores can be included in waveguide 100. In addition, multiple levels of waveguides and or waveguide cores can be built atop one another.

Generally, during the fabrication process of waveguide 140, a first layer of the material including the nano-pores is deposited onto the substrate 110 and patterned. Thereafter, a hard mask is patterned so that a waveguide core material with a different percent weight of sacrificial material (i.e., different concentration of nano-pores) can be deposited on the first cladding layer of the material to form the waveguide core 150. Subsequently, a second layer of the same material used for the first layer is deposited onto the first layer and the waveguide core. Removal of the sacrificial material from nano-pores located within each layer (both cladding and core layers) is then initiated through decomposition, volatilization, or other mechanisms to form the waveguide core layer 150 and cladding layer 120. The processes forming the cladding layer 120 and the waveguide layer 150 are discussed in more detail hereinafter.

For the purposes of illustration only, and without limitation, waveguide 140 can be described with particular reference to the below-described fabrication method. For clarity, some portions of the fabrication process are not included in FIGS. 5A–5G. For example, photolithography or similar techniques could be used to define the first and second cladding layers and/or the waveguide core 150 pattern.

The following fabrication process is not intended to be an exhaustive list that includes all steps required for fabricating waveguide 140. In addition, the fabrication process is flexible because the process steps may be performed in a different order than the order illustrated in FIG. 5A–5G.

Figure 5A:
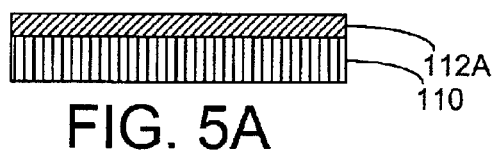
FIGS. 5A–5G are cross-section views of the fabrication process of the optical waveguide illustrated in FIG. 4.

FIGS. 5A–5G are cross-sectional views of a fabrication process relative to the view illustrated in FIG. 4. FIG. 5A illustrates the first layer 112A of the first host material disposed on the substrate 110. As indicated above, the host material includes a given fixed percentage of nano-pores having a sacrificial material disposed therein.

Figure 5B:

FIG. 5B illustrates a hard mask 122A disposed on the first layer 112A of the material. The hard mask 122A can be constructed from material such as, for example, Au, Cr, or Al, or any dielectric material that absorbs UV radiation.

Figure 5E:
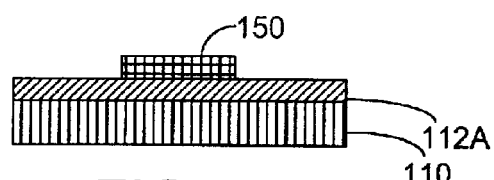
Figure 5C:
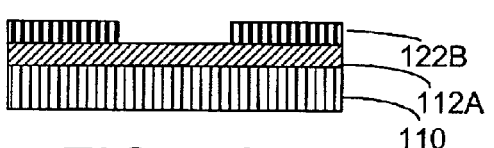

FIG. 5C illustrates patterning the hard mask 122A into hard mask 122B. The hard mask 122A is patterned to define the region where a second host material composed of a second, different percent weight of sacrificial material is deposited to form waveguide core 150.

Figure 5F:
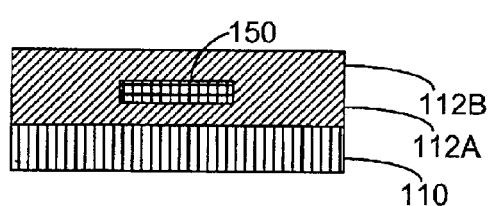
Figure 5D:
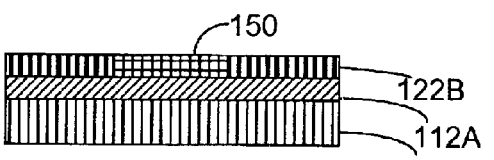

FIG. 5D illustrates the waveguide core 150 disposed on the first layer 112A.

FIG. 5E illustrates the removal of the hard mask 122B.

FIG. 5F illustrates a second layer 112B of the first host material disposed on the first layer 112A and the waveguide core 150.

Figure 5G:
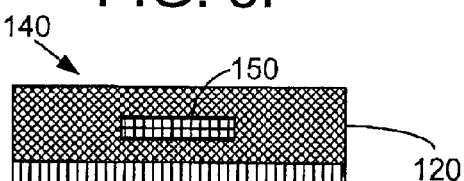

FIG. 5G illustrates the curing of waveguide 140 and removal of sacrificial material from nano-pores within the first layer 112A, the waveguide core 150 and the second layer 112B to form the waveguide 140.

It should be noted that the foregoing method shown in FIGS. 5A–5G can be altered to incorporate adding coupler elements and other components.

Example 3

Figure 6A:
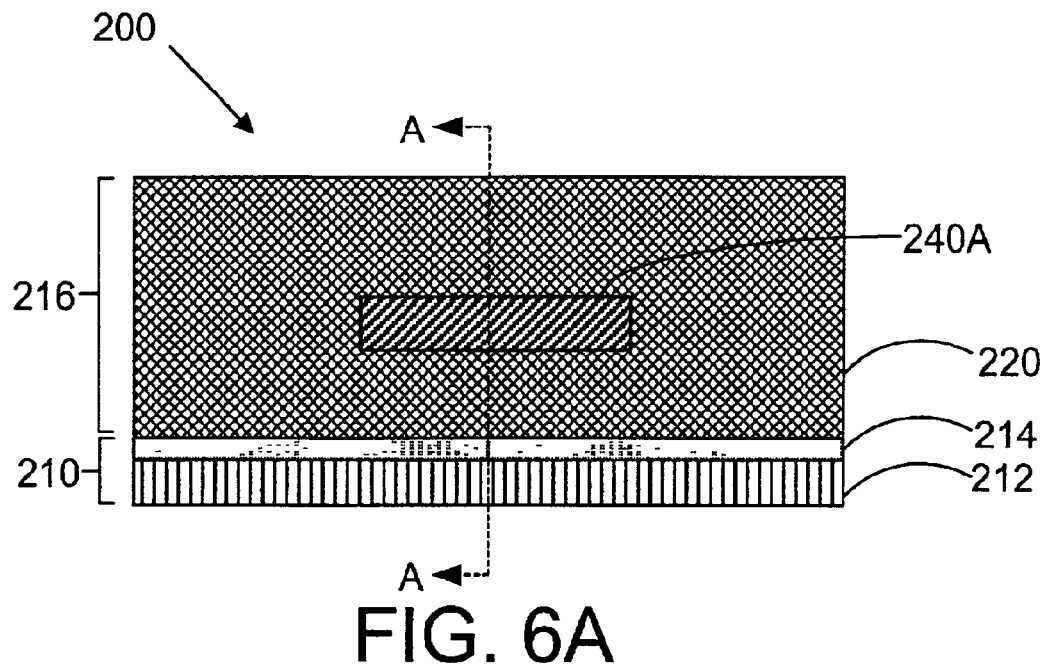
FIGS. 6A and 6B are schematics that illustrate two cross-sectional views of a device incorporating the optical waveguide shown in FIG. 4.
Figure 6B:
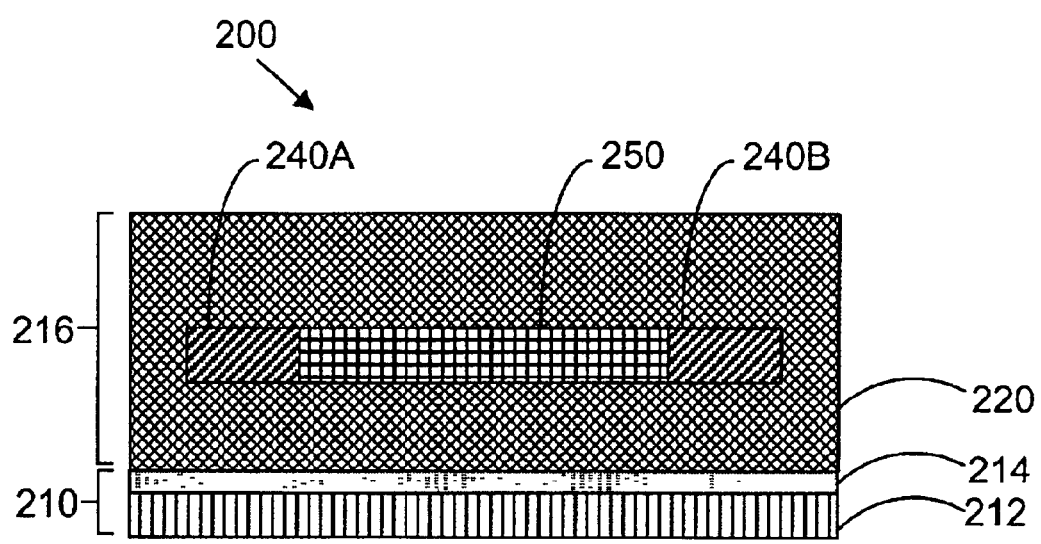

FIGS. 6A and 6B are schematics that illustrate two cross-sectional views of device 200. FIG. 6B is a cross-sectional view of FIG. 6A in substantially the A—A direction, as shown by the arrows in FIG. 6A.

Device 200 includes a substrate 210 and waveguide 216. The waveguide 216 is disposed on the substrate 210. The waveguide core 250 is disposed in the cladding layer 220, which is disposed on the substrate 10.

The substrate 210 includes a low dielectric constant layer 212 and a metal layer 214. The low dielectric constant layer 212 is composed of the nano-porous materials discussed in prior examples. The metal layer 214 is composed of such metals as, for example, Cu or Al.

In general, the waveguide 216 can be defined through any of the fabrication processes previously discussed in prior examples. In addition, the waveguide 216 can have geometries such as, for example, a raised strip geometry, buried geometry, or rib geometry.

The waveguide 216 includes a cladding layer 220, coupler elements 240A and 240B, and a waveguide core 250. The waveguide core 250 and the cladding layer 220 are analogous to the waveguide core 150 and the cladding layer 220 shown in FIG. 4.

As depicted in FIGS. 6A and 6B, the waveguide 216 includes a cladding layer 220 engaging (e.g., surrounding a portion of the waveguide core 250 and the coupler elements 240A and 240B) the waveguide core 250 and the coupler elements 240A and 240B.

The waveguide 216 includes coupler elements 240A and 240B disposed at each end of the waveguide core 250. In this manner, energy (e.g., light) can enter one coupling element 240A, travel down the waveguide core 250, and exit another coupling element 240B.

The type of coupler elements 240A and 240B that can be used include planar (or volume) grating coupler elements, surface-relief grating coupler elements, and total internal reflection coupler elements, for example. The coupler elements are described in more detail below in regard to FIGS. 7A–7C.

In this embodiment, the waveguide core 250 is made of a different material than the cladding layer 220. Examples of materials that can be used as the waveguide core 250 include, but are not limited to, compounds such as methyl-silsesquioxane (MSQ) and organic waveguide materials such as polyimide, for example.

It should be noted that other embodiments of device 200 have the waveguide core and the cladding material as the same material, similar to Example 1.

Figure 7A:
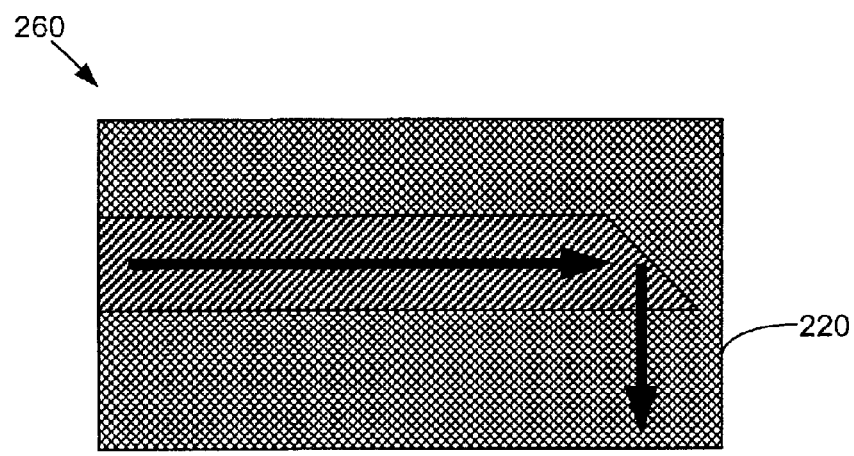
FIGS. 7A–7C are schematics that illustrate a cross-sectional view of three coupler elements that can be incorporated into the device in FIGS. 6A and 6B.

FIG. 7A illustrates a mirror element 260 based on total internal reflection (TIR) mirrors. The mirror element 260 can be formed either through etching or by laser ablation. As shown by the arrows in FIG. 7A, optical energy can be directed from the waveguide core 250 through the cladding layer 220 by using the mirror element 260.

Figure 7B:
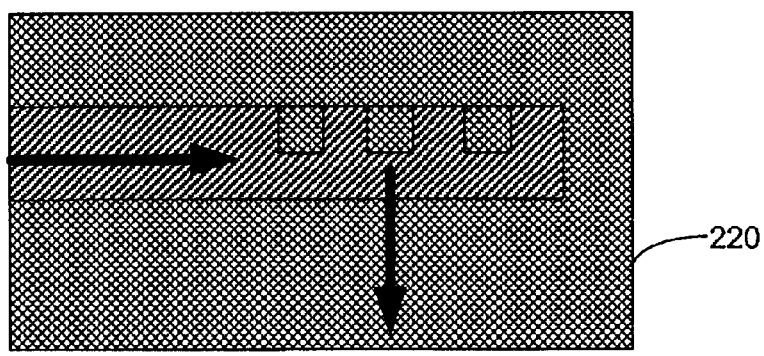

FIG. 7B illustrates a spatially-varied refractive index coupler element 261 based on a surface-relief grating pattern. The surface-relief coupler element 261 can be formed by defining alternating regions of high and low refractive index in a periodic manner. In this regard the surface-relief coupler element 261 can be formed through the use of multiple solutions of host/sacrificial material in a manner similar to Example 2, for example. As shown by the arrows in FIG. 7B, optical energy can be directed from the waveguide core 250 through the cladding layer 220 by using the surface-relief coupler element 261.

Figure 7C:
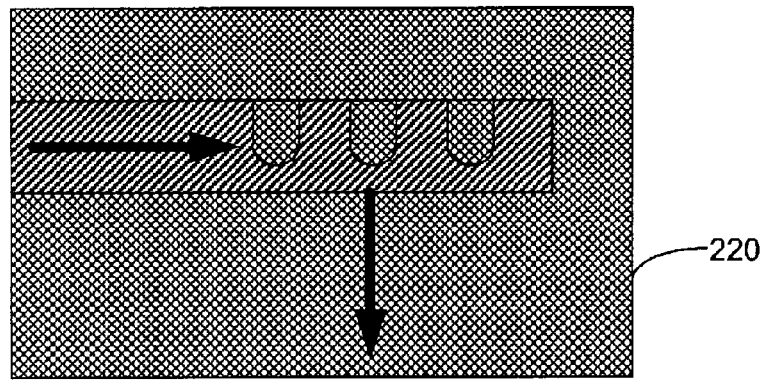

FIG. 7C illustrates a spatially-varied refractive index coupler element 262 based on a volume grating pattern. The volume coupler element 262 can be formed by defining alternating regions of high and low refractive index in a periodic manner. In this regard the volume coupler element 262 can be formed by either a thermal process using a metal shield or by using UV irradiation, for example. As shown by the arrows in FIG. 7C, optical energy can be directed from the waveguide core 250 through the cladding layer 220 by using the spatially-varied refractive index coupler element 262.

It should be emphasized that the above-described embodiments of the present invention are merely possible examples of implementations, and are set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A waveguide, comprising:

a waveguide core made of a first host material having a plurality of nano-pores, wherein the nano-pores include a sacrificial material, wherein the sacrificial material has a decomposition temperature less than a decomposition temperature of the first host material, wherein the decomposition temperature of the sacrificial material is greater than the cure temperature of the first host material; and a cladding layer made of a second host material having a plurality of nano air-gaps, wherein the cladding layer is disposed around the waveguide core.

2. The waveguide of claim 1, wherein the first host material and the second host material comprise the same host material.

3. The waveguide of claim 1, wherein the first host material and the second host material comprise different host materials.

4. The waveguide of claim 1, wherein the nano-pores include a first amount of the sacrificial material so that the cladding layer has a lower refractive index than the waveguide core.

5. The waveguide of claim 1, wherein the nano air-gaps include a second amount of the sacrificial material so that the cladding layer has a lower refractive index than the waveguide core.

6. The waveguide of claim 1, wherein the first host material and the second host material are selected from methylsilsesquixane and polyimides.

7. The waveguide of claim 1, wherein the first host material and the second host material includes methylsilsesquixane.

8. The waveguide of claim 1, wherein the sacrificial material is chosen from trimethoxysilye norborene, polynorbornenes, polyoxymethylene, polycarbonates, polyethers, and polyesters.

9. The waveguide of claim 1, wherein the nano air-gaps have a diameter of about 1 to about 15 nanometers.

10. The waveguide of claim 1, further comprising at least one coupler element.

11. The waveguide of claim 1, wherein the sacrificial material includes mesitylene.

12. A device, comprising:
a substrate; and
a waveguide disposed on the substrate, wherein the waveguide includes:
a waveguide core made of a material having a plurality of nano-pores, wherein the nano-pores include a sacrificial material, wherein the sacrificial material has a decomposition temperature less than a decomposition temperature of the first host material, wherein the decomposition temperature of the sacrificial material is greater than the cure temperature of the first host material; and
a cladding layer made of the material having a plurality of nano air-gaps.

13. The device of claim 12, wherein the substrate is selected from a complementary metal oxide semiconductor wafer, compound semiconductor wafer, a fully processed semiconductor substrate, a partially processed semiconductor substrate, a dielectric substrate, a printed wiring board, a multi-chip module, fused silica, and a backplane substrate.

* * * * *